United States Patent
Sasaki

Patent Number: 5,926,765
Date of Patent: Jul. 20, 1999

[54] MOBILE TELEPHONE SYSTEM FOR DETERMINING A POSITION OF A MOBILE TELEPHONE

[75] Inventor: Yutaka Sasaki, Tokyo, Japan

[73] Assignee: NEC Corporation, Tokyo, Japan

[21] Appl. No.: 08/786,717

[22] Filed: Jan. 21, 1997

[30] Foreign Application Priority Data

Feb. 2, 1996 [JP] Japan .................................. 8-017374

[51] Int. Cl.⁶ .................................................. H04B 7/005
[52] U.S. Cl. ........................... 455/456; 455/457; 342/450
[58] Field of Search .................................... 342/450, 458; 455/67.1, 67.6, 115, 456, 457

[56] References Cited

U.S. PATENT DOCUMENTS

| | | | |
|---|---|---|---|
| 4,494,119 | 1/1985 | Wimbush . | |
| 5,218,367 | 6/1993 | Sheffer et al. . | |
| 5,293,645 | 3/1994 | Sood | 455/67.6 |
| 5,432,842 | 7/1995 | Kinoshita et al. . | |
| 5,513,246 | 4/1996 | Jonsson et al. | 455/456 |
| 5,564,079 | 10/1996 | Olsson | 455/456 |
| 5,666,662 | 9/1997 | Shibuya | 455/67.1 |
| 5,732,354 | 3/1998 | MacDonald | 455/67.6 |

FOREIGN PATENT DOCUMENTS

| | | |
|---|---|---|
| 5-328432 | 12/1993 | Japan . |
| 7-231473 | 8/1995 | Japan . |
| 7-298350 | 11/1995 | Japan . |
| 1 406 674 | 9/1975 | United Kingdom . |
| WO 92/13284 | 8/1992 | WIPO . |

*Primary Examiner*—Edward F. Urban
*Assistant Examiner*—Thuan T. Nguyen
*Attorney, Agent, or Firm*—Young & Thompson

[57] ABSTRACT

A cordless telephone is disclosed that displays the relative position of a communication partner's cordless telephone during conversation between cordless telephones and that includes a received field level detector that measures the received field level; a memory section that inputs and stores the position at which received field level is first detected and positions subsequently detected; a control section that determines the relative position of a communication partner's cordless telephone by performing a three-point measurement based on the results of detecting received field level three times and on the resulting detected positions, and a display section that displays the measurement result.

20 Claims, 6 Drawing Sheets

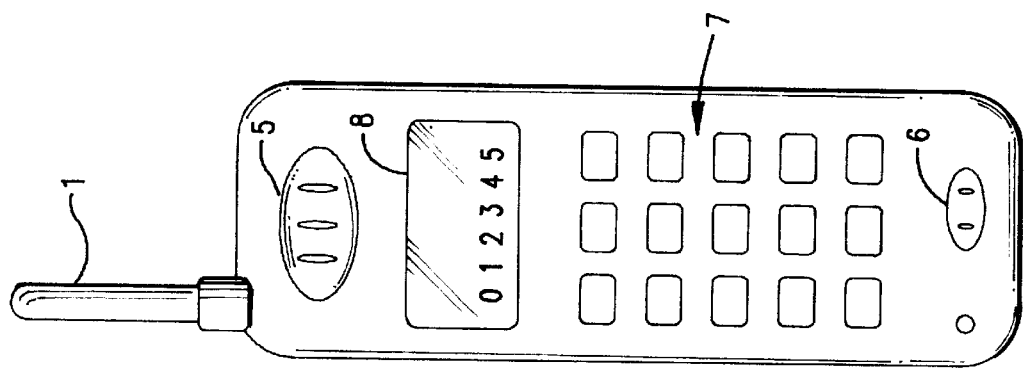
FIG. 6
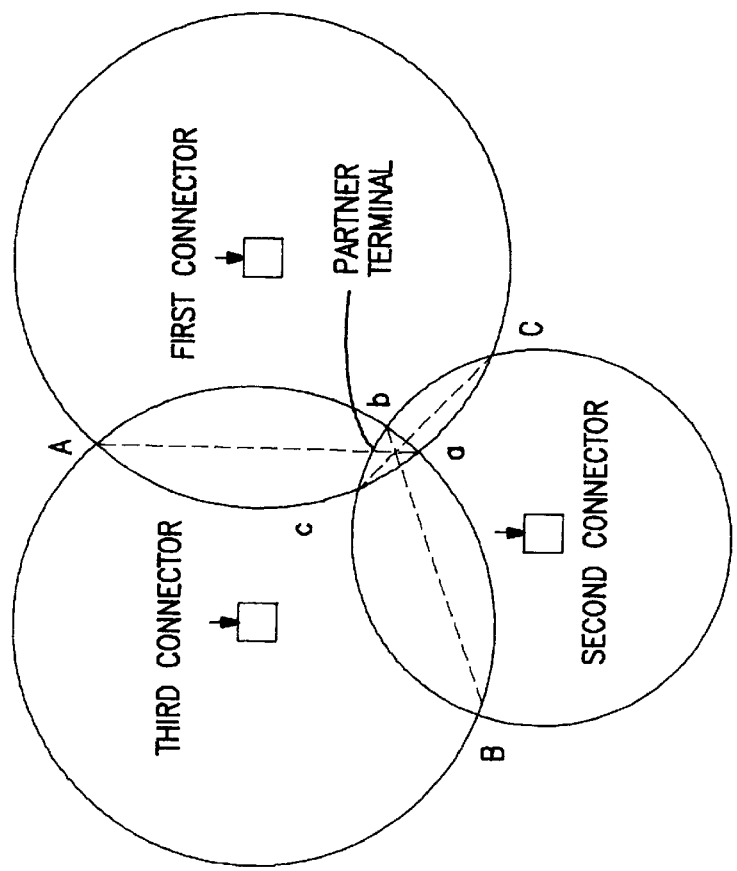
FIG. 5
FIG. 2
PRIOR ART

MOBILE TELEPHONE SYSTEM FOR DETERMINING A POSITION OF A MOBILE TELEPHONE

BACKGROUND OF THE INVENTION

1. Field of the Invention

The present invention relates to a mobile telephone system, and particularly to a cordless telephone system.

2. Description of the Related Art

A cordless telephone system that indicates position information of a caller to a called side and position information of the called side to the caller is described in Japanese Patent Laid-open No. 328432/1993. This cordless telephone system will be described with reference to FIG. 1 and FIG. 2. FIG. 1 is a block diagram of the above-described cordless telephone system, which is made up of a main unit 51, a plurality of cordless telephone connectors BS1-BSn connected to main unit 51, and a plurality of cordless telephones T1-Tm. Each of cordless telephone connectors BS1-BSn forms a radio zone RZ1-RZn, respectively. Main unit 51 comprises call processing section 52, memory section 53, external line interface 54, channel switch 55, and cordless telephone connector interface 56.

Memory section 53 is written to and read out by call processing section 52 and includes position registration information memory section 531.

As shown in FIG. 2, zone information indicating the radio zones RZ1, RZ2, . . . RZn those are position-registered for cordless telephones, T1, T2, . . . Tm corresponding to the extension numbers "1000," "1001," . . . "2000".

Call processing section 52 manages position registration information memory section 531, controls connections between telephone lines L1-Lk and cordless telephones T1-Tm, and controls connections between cordless telephones T1-Tm. Of the various controls performed by call processing section 52, extension processing section 521 performs control relating to extension communications between cordless telephones T1-Tm.

External line interface 54 interfaces with telephone lines L1-Lk.

Channel switch 55 connects channels under the control of call processing section 52.

Cordless telephone connector interface 56 interfaces with cordless telephone connectors BS1-BSn.

Each cordless telephone Ti (1<i<m) has the following functions in addition to ordinary voice communication functions:

1. Numerals and letters indicated by display information sent from extension processing section 521 of main unit 51 by way of cordless telephone connector interface 56 and cordless telephone connectors BS1-BSn are shown on a display (not shown).
2. The reception levels of radiowaves for control use outputted at fixed time intervals from each of cordless telephone connectors BS1-BSn are compared and the cordless telephone connector BSj (1≦j≦n) having the best reception state is detected.
3. If the name of the cordless telephone connector stored in a transmission destination registration area (not shown) that is internally provided differs from the detected name of the cordless telephone connector BSj, the name of the cordless telephone connector registered in transmission destination registration area is rewritten to the detected name of cordless telephone connector BSj (the name of the cordless telephone connector stored in the transmission destination registration area indicates the transmission destination cordless telephone connector of the call establish message).
4. If the name of the cordless telephone connector stored in the transmission destination registration area differs from the name of detected cordless telephone connector BSj, position registration information including the extension number assigned to cordless telephone Ti is transmitted to cordless telephone connector BSj.

At the main unit, moreover, position registration information including the extension number of cordless telephone Ti that is transmitted to cordless telephone connector BSj from cordless telephone Ti is sent to call processing section 52 through cordless telephone connector interface 56; and, based on the sent position registration information, call processing section 52 rewrites stored zone information corresponding to the extension number of cordless telephone Ti of the zone information stored in position registration information memory section 531 to zone information indicating the radio zone RZj formed by cordless telephone connector BSj. By means of this processing, cordless telephone Ti is position-registered in radio zone RZi.

Although the above-described cordless telephone system enables display of the position information of a communication partner terminal, but the position information indicates only the radio zone, particularly a particular vicinity within the zone cannot be indicated.

Furthermore, a plurality of cordless telephone connectors and systems for managing the plurality of cordless telephone connectors are required, resulting in a large-scale construction and system complexity. Moreover, telephones cannot be used beyond the range of the radiowaves of the cordless telephone connectors within this system.

Finally, such a system is vulnerable to invasion of privacy because location checking can be effected by any number of unspecified people.

SUMMARY OF THE INVENTION

The object of the present invention is to provide a mobile radiotelephone system which solves the above-described problems and in which the distance and direction of the position of a communication partner terminal can be specified.

Another object of the present invention is to provide a mobile radiotelephone system that does not result in undue increase in the size of the device, and which allows the use of a simple system.

To achieve the above-described objects, the mobile radiotelephone system according to the present invention includes a plurality of mobile radio terminals, a switching device for connecting mobile radio terminals to other terminals within the same network or within another network, and connectors which are radio base stations that connect the mobile radio terminals with the switching device; wherein the mobile radio terminals are provided with:

received level detection means for detecting the received field level of received signals; calculation means for calculating the distance from a mobile radio terminal to a partner mobile radio terminal by means of the inputted level of a detected received field; storage means, that includes an input means, for storing in a memory device a first detected position which is the position at which a received level is first detected by the detection means, and the relative positions of a detected positions at which received levels are subsequently detected using the first detected position as a reference; direction detection means for detecting the direction of the position of the partner mobile radio terminal with respect to the mobile radio terminal based on the first detected position and subsequently detected positions; and display means for displaying the distance calculated by the calculation means and the direction detected by the direction detection means.

In addition, the mobile radio terminal preferably includes a transceiver function.

The mobile radiotelephone system further includes a digital cordless radiotelephone system.

Moreover, at least one or two items of information among the received level of the first detection and the received levels subsequently detected at different positions may be information items from the connectors.

In addition, this system includes as a modification a case in which the connector is a connector for household use which is also the main unit of a cordless radio telephone system, and the calculated distance and direction are preferably displayed on the connector for household use.

The calculation means preferably employs a directreading table that refers to an absolute level ratio between the reference level and received field levels. The above and other objects, features, and advantages of the present invention will become apparent from the following description based on the accompanying drawings which illustrate examples of preferred embodiments of the present invention.

BRIEF DESCRIPTION OF THE DRAWINGS

FIG. 2 shows the content of the register of the position registration information memory section shown in FIG. 1.

FIG. 5 is an explanatory view of the calculation of position in the present invention.

FIG. 6 is a external view of a digital cordless mobile terminal of the present invention.

DETAILED DESCRIPTION OF THE PREFERRED EMBODIMENTS

Figure 3:
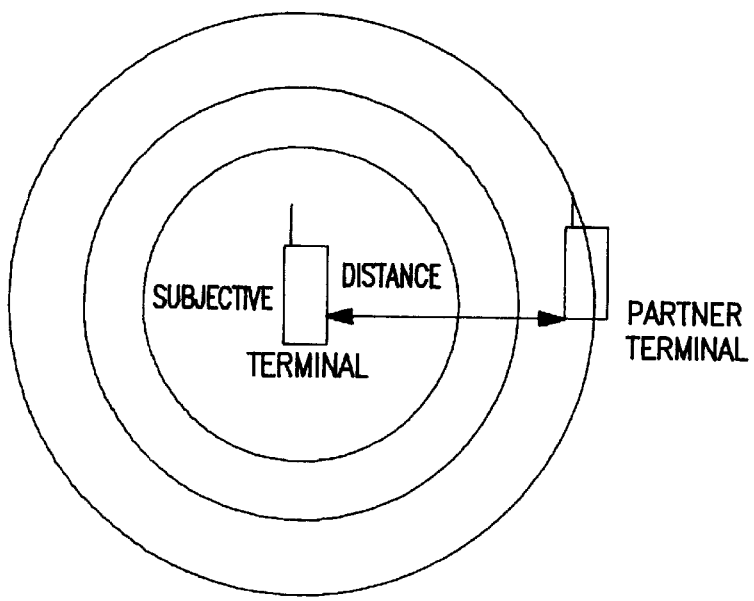
FIG. 3 shows the relation between received field level and direction in the mobile radiotelephone system according to the present invention.
Figure 4:
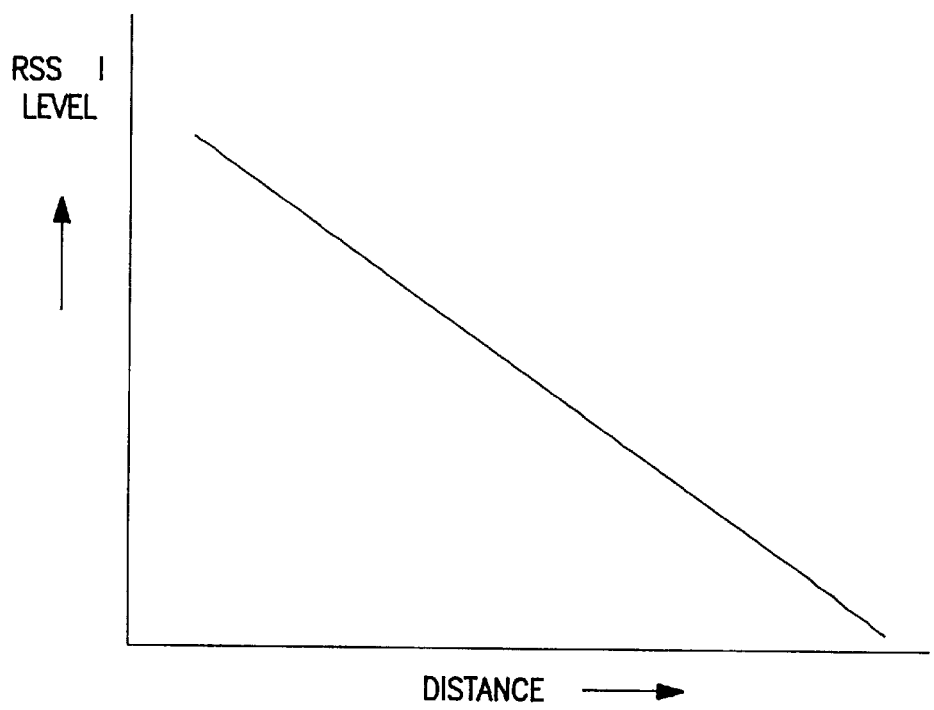
FIG. 4 shows the relation between received field level and relative distance in a mobile radiotelephone system according to the present invention.

As shown in FIG. 3, the relation between the bearing and the received field level of radiowaves transmitted from a partner terminal of a mobile radiotelephone system changes uniformly in all directions as long as no obstructions are present, and therefore can be represented by concentric circles. Here, the received field level of the mobile radiotelephone system and the relative distance are in inverse proportion, as shown in FIG. 4.

Generally, the field level decreases at a rate of about 6 dB each time the distance doubles.

FIG. 3 shows a partner terminal, but this may also be a connector or a mobile radiotelephone system.

In the present invention, the position of a cordless telephone is detected in a cordless telephone system through a cordless telephone connector based on this type of relation between bearing and distance and received field level, and this position is displayed on the mobile radiotelephone system of the communication partner.

FIG. 5 is an explanatory view of the detection of the position of a mobile terminal in the cordless telephone system of the present invention.

First, the received field level of a partner terminal inputted to the first cordless telephone connector (Abbr. connector) is measured, following which the received field level of the partner terminal inputted to the second connector is measured. If circles are then drawn based on the respective measured received field level for each connector, the partner terminal can be considered approximately to lie on the straight line joining the intersections of the two circles (on broken line C-c in FIG. 5).

Next, the received field level of the partner terminal inputted to the third connector is measured. By the same reason as described hereinabove, the partner terminal can be considered to lie on the broken line B-b in FIG. 5 based on the received field level at the second connector and the received field level at the third connector.

As a result, the partner terminal can be understood to lie on the intersection of broken line C-c and broken line B-b of FIG. 5. To confirm, the broken line A-a of FIG. 5 can ideally be drawn in the same way, from which it can be seen that all straight lines will meet at the same point.

Figure 1:
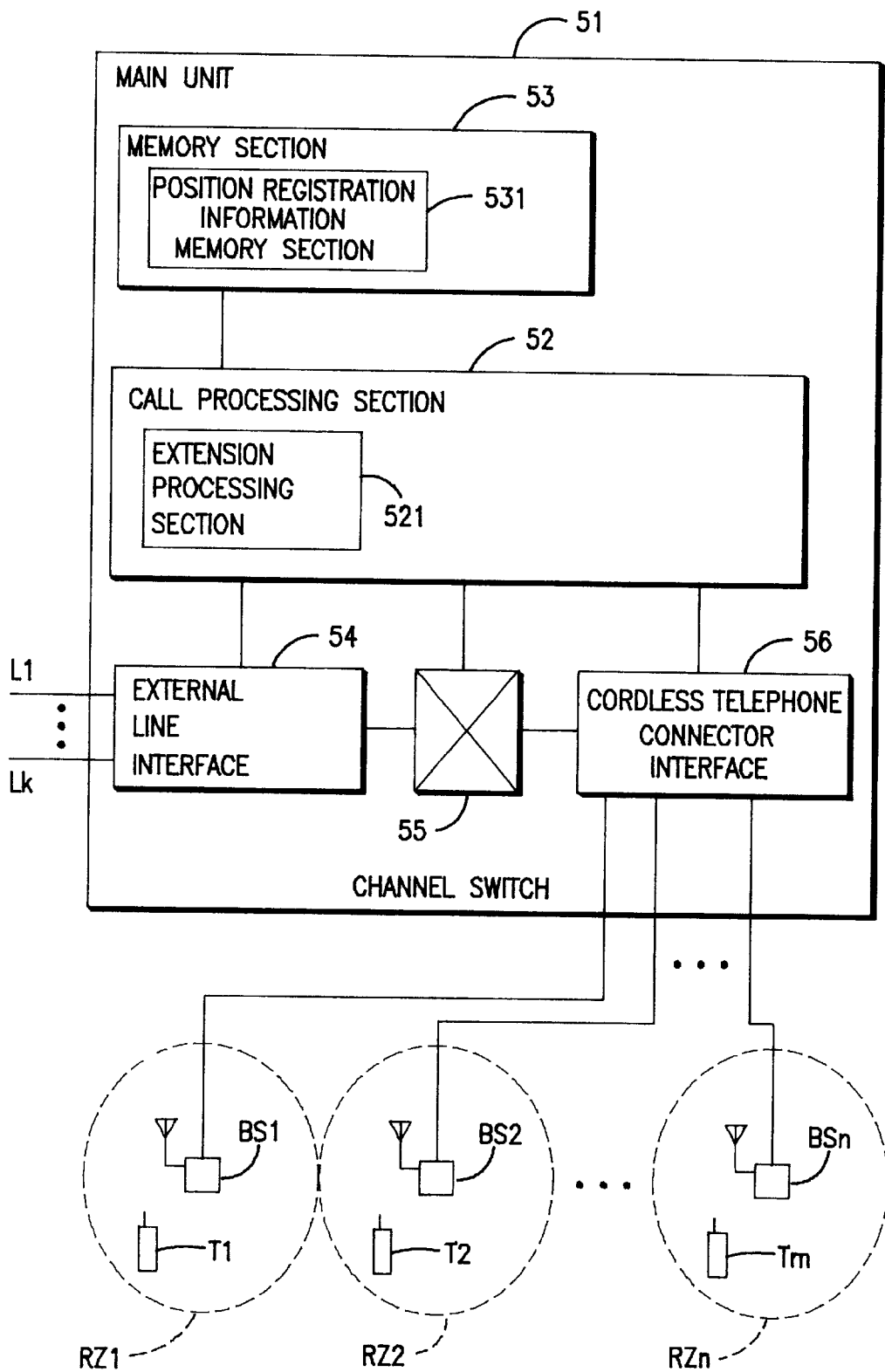
FIG. 1 is a block diagram showing one example of a mobile radio telephone system according to the prior art.

In this way, each connector sends the detected received field level to the main unit (refer to FIG. 1), and at main unit 51, based on the received field level information from each connector, the direction and distance from one connector of the terminal (preferably the zone having the highest received field level) are stored together with zone information, and information pertaining to direction and distance can then be transmitted to the communication partner terminal and displayed.

Next will be described another embodiment of the present invention. FIG. 6 is an outer view of a digital cordless mobile terminal according to the present invention, and FIG. 7 is a block diagram showing the construction of the mobile terminal shown in FIG. 6.

The mobile terminal shown in FIG. 6 has a transceiver function, and can communicate with other mobile terminals without requiring an intermediary connector.

Figure 8:
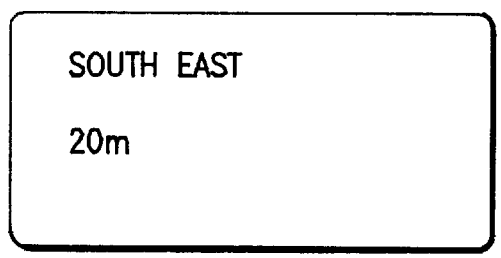
FIG. 8 shows one example of the direction and distance of a communication partner terminal in display unit 8 shown in FIG. 6.

The digital cordless mobile terminal shown in FIG. 6 includes antenna 1, speaker 5, microphone 6, keypad 7, and display section 8. As shown in FIG. 8, display section 8 indicates the direction and distance of the communication partner terminal. FIG. 8 shows one example of the display of the display section, which in this case indicates "20 m to the southeast."

Figure 7:
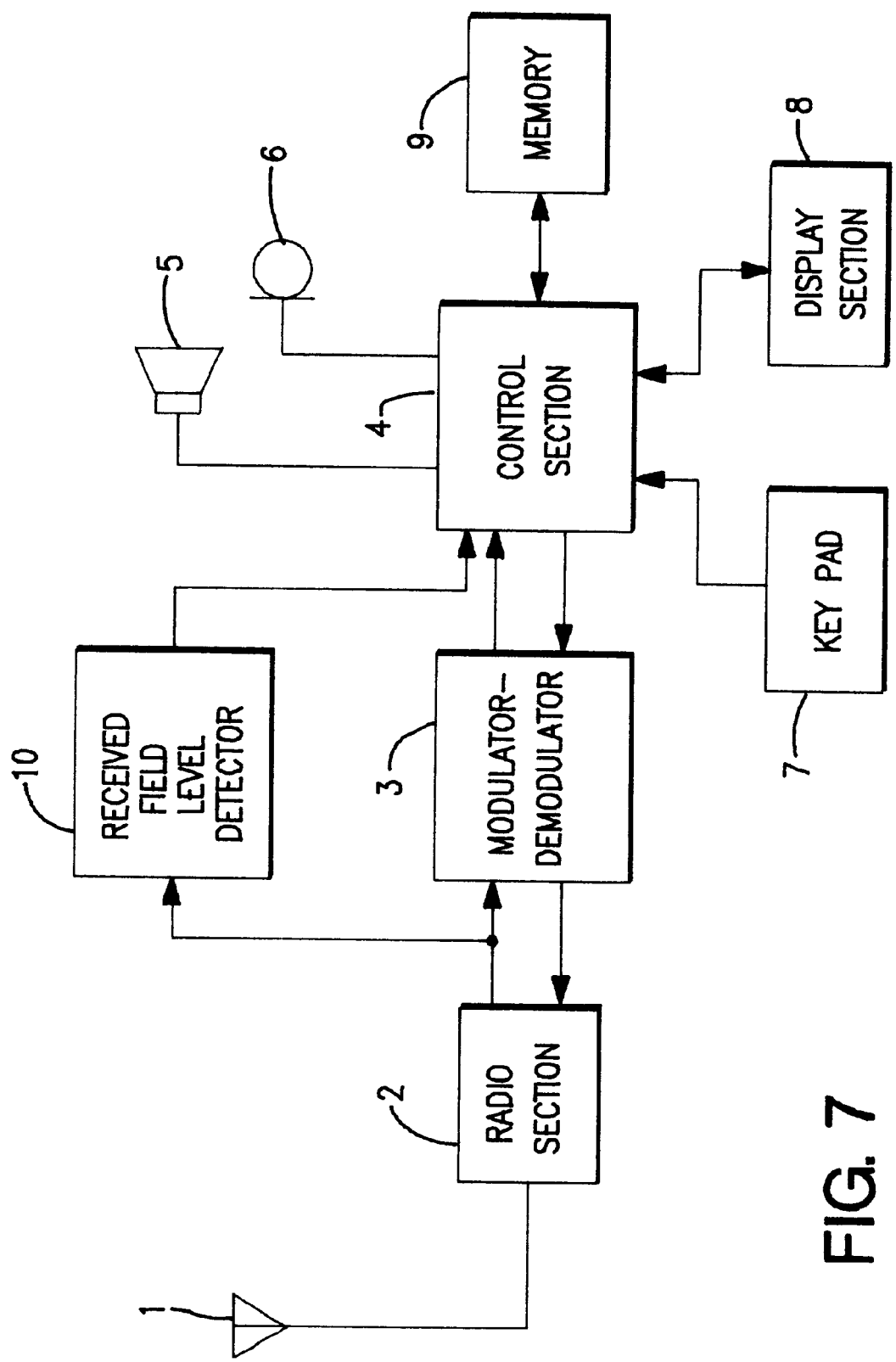
FIG. 7 is a block diagram showing the construction of the digital cordless mobile terminal shown in FIG. 6.

In FIG. 7 shows that in addition to the construction shown in FIG. 6, the digital cordless mobile terminal includes radio section 2, modulator-demodulator 3, control section 4, memory 9, and received field level detector 10.

Signals from a partner terminal are received at radio section 2 via antenna 1, and demodulated by means of modulator-demodulator 3. The demodulated signals are decoded at control section 4 and outputted as audio signals from speaker 5. In addition, received signals from radio section 2 are supplied to received field level detector 10, where the received field level is detected. The detected received field level is stored in memory 9 by way of control section 4. On the other hand, audio signals from microphone 6 are encoded by means of control section 4, modulated at modulator-demodulator 3, and transmitted by way of radio section 2 and antenna 1.

Keypad 7 is for inputting, for example, a destination telephone number, and memory 9 is for storing, for example, destination telephone numbers and detected received field levels.

The principles of detection of position information of a communication partner terminal in this embodiment will next be explained with reference to FIG. 9.

First, the received field level of a partner terminal first inputted to the subjective terminal is measured, and stored. Next, a second received field level is measured after movement of the subjective terminal. Here, based on the relation between the received field level and the relative distance, and the relation between the received field level and bearing, circles of identical received field levels are drawn and the partner terminal is located on the straight line joining the points of intersection (on broken line C-c in FIG. 9).

Figure 9:
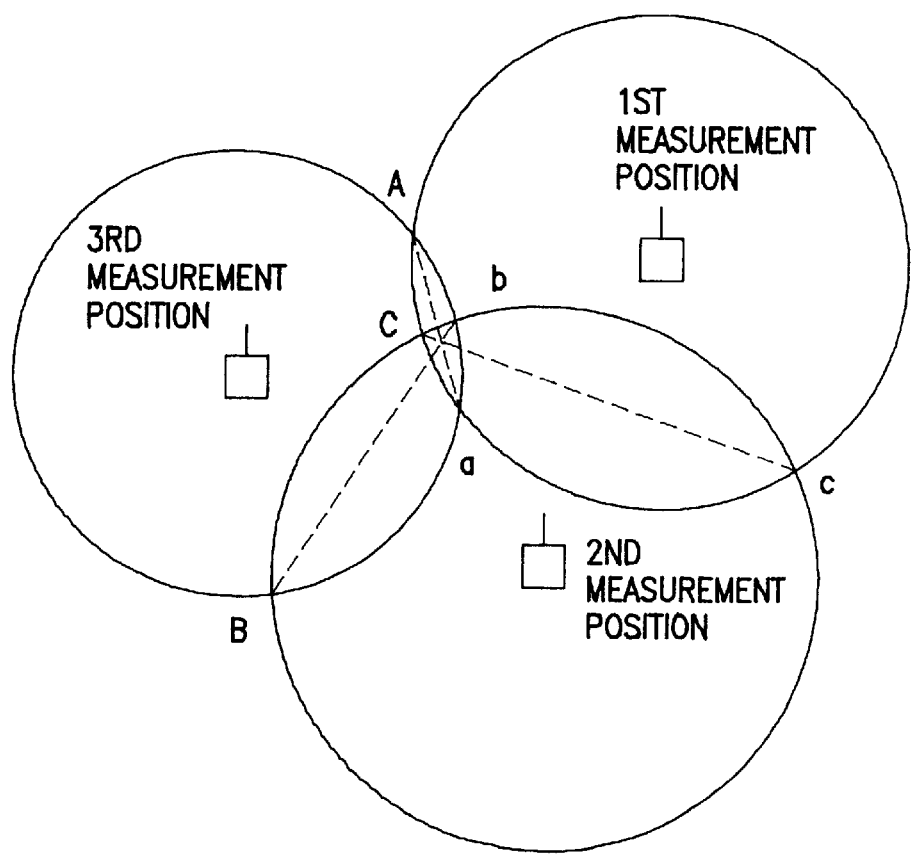
FIG. 9 is an explanatory view of the detection of position of a communication partner terminal in another embodiment of the present invention.

The terminal measures a third received field level after further movement, and, following the same reasoning described above, the partner terminal is located on broken line B-b of FIG. 9 based on the second received field level and the third received field level.

As a result, the partner terminal is located at the intersection of broken line C-c and broken line B-b of FIG. 9. For the sake of confirmation, the broken line A-a in FIG. 9 can ideally also be drawn in the same manner, whereby it can be seen that all straight lines intersect at the same point.

Figure 10:
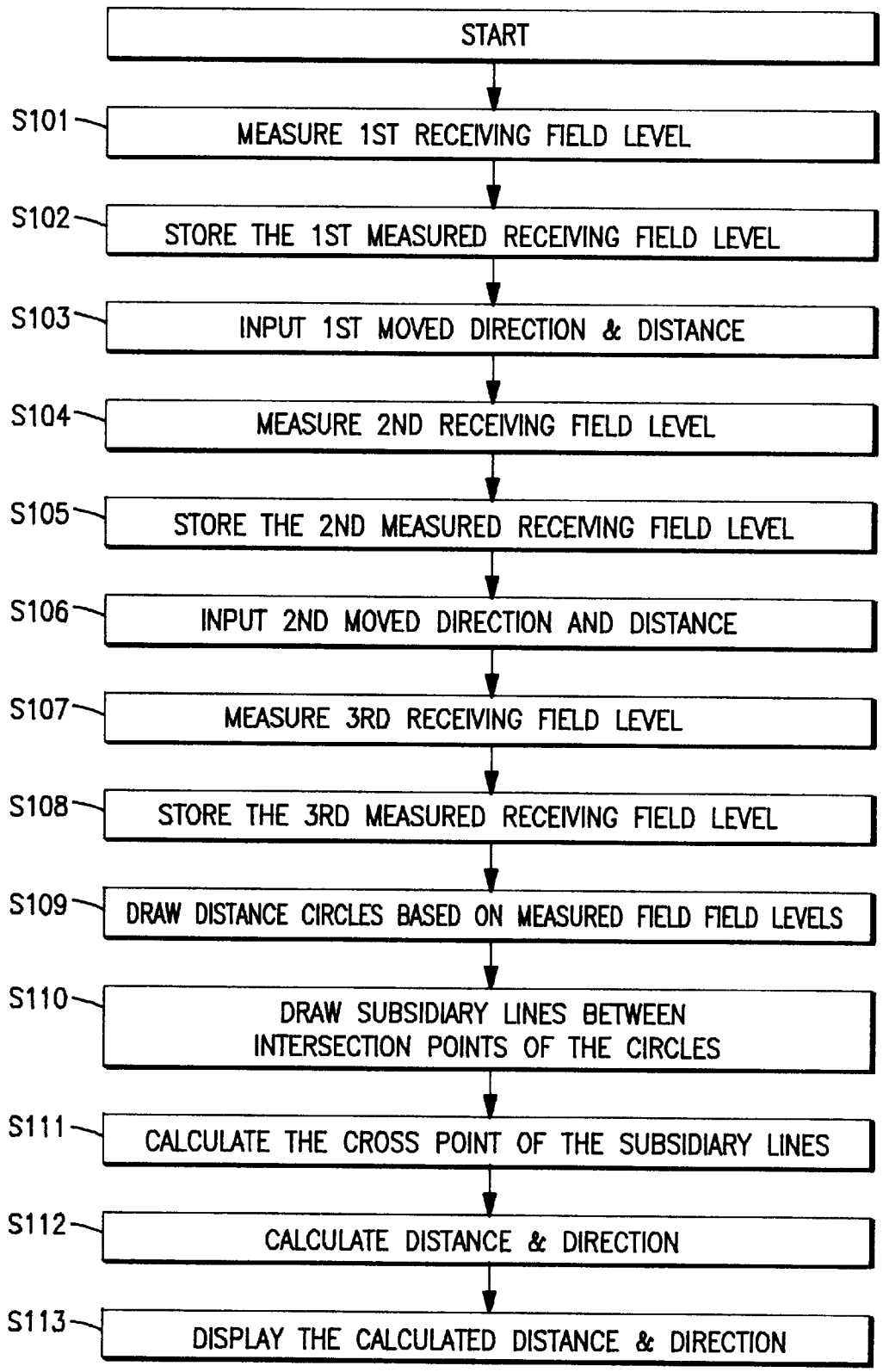
FIG. 10 is a flow chart showing the operation of a mobile radiotelephone system according to the present invention.

An explanation will next be given with reference to the flow chart shown in FIG. 10 regarding the position detection and display of a partner terminal in the digital cordless telephone shown in FIG. 7.

To predict the bearing and distance to the terminal of a communication partner as seen from one particular terminal, the received level of radiowaves generated from the partner terminal are first measured by means of received field level detector 10 (S101).

This received level is stored in memory 9 (S102), the terminal is moved as appropriate (for example, 30 m to the northwest), and the received level of radiowaves generated from the partner terminal is again measured and stored (S104 and S105). Here, using the position before movement as a reference, the distance traveled by the terminal together with its bearing (for example, north, south, east, or west) is inputted to the terminal from keypad 7 (S103) and stored in memory 9.

As explained with regard to FIGS. 3 and 4, based on the received level, the distance to the partner terminal can to a certain degree be predicted from data previously inputted.

For example, for a terminal having an inputted field level of 40 dBμ at a distance of 100 m, the field level will decrease about 6 dB if the distance is doubled, and increase by 6 dB if the distance is halved. Therefore, if the field level first inputted is 46 dBμ, it can be seen that the partner terminal is located at a distance of 50 m on a concentric circle.

Next, if the terminal travels 30 m to the northwest and the inputted field level decreases by about 2 dB, the ratio Y of distance can be found as follows:

$$\log Y = \frac{2}{\log 2} 6$$

$$Y = 1.259$$

Accordingly, the distance (due to the decrease in field level) is:

$$Y \times 50 = 63 m$$

and the partner terminal is thus located on a circle having a radius of 63 m.

As a result, if the relative distance from the partner terminal can be found at two points obtained by movement of the terminal itself, the relative position of the partner terminal with respect to the terminal can be limited to two points.

In other words, this is a process of finding the points of intersection between concentric circles for which the first vector from the terminal to the partner terminal is A and the next vector from the terminal to the partner terminal is B.

The terminal is again moved as appropriate (for example, 20 m to the northeast) (S106), and the received level of radiowaves generated from the partner terminal is measured and stored (S107 and S108). At this point, using the position before movement as a reference, the bearing (for example, north, south, east, or west) together with the distance traveled by the terminal are again inputted to the terminal (S106).

If the inputted field level increases by 2 dB at this time, the ratio Y of distance is found from:

$$\log Y = 2\log 2\ 6$$

and therefore, $$Y = 1.259$$

Accordingly, the distance (because the field level increased) is

50÷Y=33 m and the partner terminal can therefore be located on a circle having a radius of 33 m.

Data for three points is thus obtained (S109 and S110), and the points of intersection of vectors at two points of each as described hereinabove are found (S111) to determine the relative position of the partner terminal as seen from the terminal as shown in FIG. 3 (S112).

Here, a certain amount of error will be generated due to the resolution of inputted field level and the conditions at the location of the terminal, but this error can be considered to be on the order of about 10 m, and should not pose problems in actual use.

These results are then displayed on the display section of the terminal, the relative position of the partner terminal being indicated as a bearing (for example, southeast) and distance (for example, 40 m) using the position of the terminal at that time as a reference (S113).

Here, in calculating the received field level and the relative distance from the partner terminal, the relation between received field level and relative distance may be included as a chart in a memory table in order to raise accuracy, and in this way, calculation can be expedited.

While explanation has been presented regarding a digital cordless telephone system in the above-described embodiment, the present invention is not limited to this example, and may be applied to a cordless telephone system for household use.

A cordless telephone for household use employs a connector (main unit) that is connected to a switching system by wire lines and to mobile units by radio lines, establishes the connector as one point of the above-described 3-point measurement and mobile units as the other two points, and can detect the position of the partner terminal. In addition, the position of the partner terminal can be displayed at the connector.

As described hereinabove, a mobile radiotelephone system according to the present invention does not merely display the radio zone of the terminal of a communication partner, but enables the measurement and display of the bearing and distance of the partner terminal.

Moreover, in the present invention, information regarding the estimated distance to and bearing of the terminal of a communication partner can be obtained from only the terminals and does not require use of control by the main unit or connectors.

Finally, this invention can be applied in any location.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. A mobile radiotelephone system comprising a plurality of mobile radio terminals, a switching device for connecting mobile radio terminals to other terminals within the same network or within another network, and connectors which are radio base stations that connect said mobile radio terminals with said switching device; wherein said mobile radio terminals are provided with:

received level detection means for detecting the received field level of received signals;

calculation means for calculating distance from a mobile radio terminal to a communciation-partner mobile radio terminal by means of the detected received field level;

storage means, that includes an input means, for storing in a memory device a first detected position which is the position at which a received level is first detected by said detection means, and relative positions of a detected positions at which received levels are subsequently detected using first detected position as a reference;

direction detection means for detecting the direction of the position of said communication-partner mobile radio terminal with respect to the mobile radio terminal based on said first detected position and subsequently detected positions; and displays means for displaying distance calculated by said calculation means and direction detected by said direction detection means.

2. A mobile radiotelephone system according to claim 1 wherein said mobile radio terminal has a transceiver function.

3. A mobile radiotelephone system according claim 2 wherein at least one item of information among received level by said first detection and received levels subsequently detected at different positions is an information item from said connectors.

4. A mobile radiotelephone system according to claim 2 wherein said connector is a connector for household use which is a main unit of a cordless radiotelephone system.

5. A mobile radiotelephone system according to claim 4 wherein said calculated distance and direction are displayed on said connector for household.

6. A mobile radiotelephone system according to claim 4 wherein said calculated distance and direction are displayed on said connector for household.

7. A mobile radiotelephone system according to claim 3 wherein said connector is a connector for household use which is a main unit of a cordless radiotelephone system.

8. A mobile radiotelephone system according to claim 7 wherein said calculated distance and direction are displayed on said connector for household.

9. A mobile radiotelephone system according to claim 1 wherein said mobile radiotelephone system is a digital cordless radiotelephone system.

10. A mobile radiotelephone system according claim 9 wherein at least one item of information among received level by said first detection and received levels subsequently detected at different positions is an information item from said connectors.

11. A mobile radiotelephone system according to claim 9 wherein said connector is a connector for household use which is a main unit of a cordless radiotelephone system.

12. A mobile radiotelephone system according to claim 11 wherein said calculated distance and direction are displayed on said connector for household.

13. A mobile radiotelephone system according to claim 10 wherein said connector is a connector for household use which is a main unit of a cordless radiotelephone system.

14. A mobile radiotelephone system according to claim 13 wherein said calculated distance and direction are displayed on said connector for household.

15. A mobile radiotelephone system according claim 1 wherein at least one item of information among received level by said first detection and received levels subsequently detected at different positions is an information item from said connectors.

16. A mobile radiotelephone system according to claim 15 wherein said connector is a connector for household use which is a main unit of a cordless radiotelephone system.

17. A mobile radiotelephone system according to claim 16 wherein said calculated distance and direction are displayed on said connector for household.

18. A mobile radiotelephone system according to claim 1 wherein said connector is a connector for household use which is a main unit of a cordless radiotelephone system.

19. A mobile radio terminal for communicating with a partner mobile radio terminal in a mobile radiotelephone system, the mobile radio telephone comprising:

detection means for detecting a received field level of a signal received from the partner mobile radio telephone;

a direct-read table for providing a relative distance to the partner mobile radio telephone based on the detected field level, said table including plural field levels and predetermined corresponding distances;

storage means for storing a first position of the mobile radio telephone at which the signal from the partner mobile radio telephone is first detected, and for storing subsequent positions of the mobile radio telephone relative to said first position at which the signal from the partner mobile radio telephone is subsequently detected;

direction determining means for determining a relative direction to the partner mobile radio telephone based on said first and subsequent positions; and a display for a relative direction and distance to the partner mobile radio telephone from said table and said direction determining means.

20. A mobile radio terminal for communicating with a partner mobile radio terminal in a mobile radiotelephone system, the mobile radio telephone comprising:

detection means for detecting a received field level of a signal received from the partner mobile radio telephone;

calculation means for providing a relative distance to the partner mobile radio telephone based on the detected field level;

storage means for storing a first position of the mobile radio telephone at which the signal from the partner mobile radio telephone is first detected, and for storing subsequent positions of the mobile radio telephone relative to said first position at which the signal from the partner mobile radio telephone is subsequently detected;

direction determining means for determining a relative direction to the partner mobile radio telephone based on said first and subsequent positions; and a display for a relative direction and distance to the partner mobile radio telephone from said table and said direction determining means.

* * * * *